Oct. 18, 1949.  W. J. COTTON  2,485,481
ELECTROCHEMICAL PRODUCTION OF NITROGEN OXIDE
Filed June 17, 1949  4 Sheets-Sheet 1
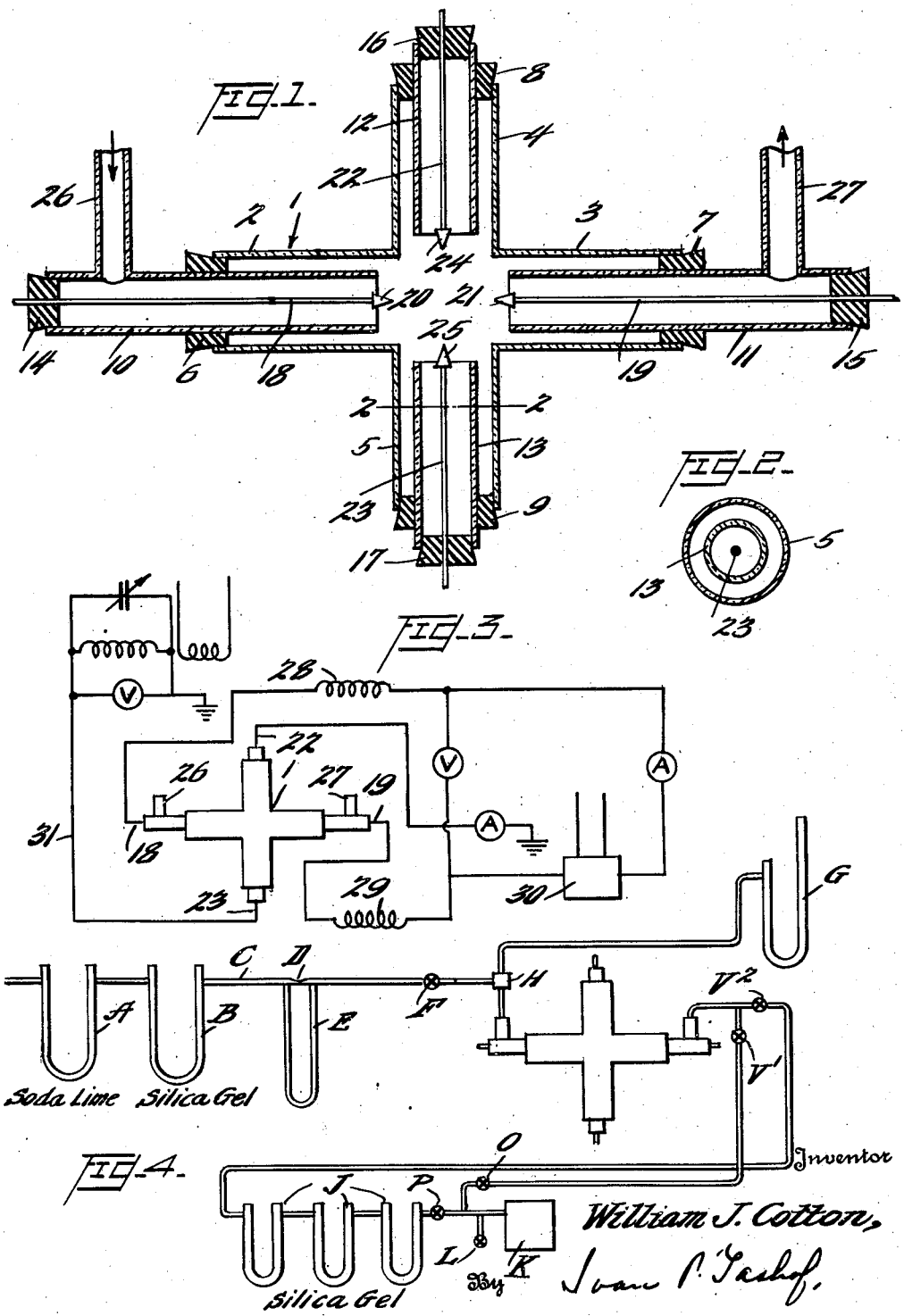
Inventor
William J. Cotton,
By Ivan P. Tashof.
Attorney

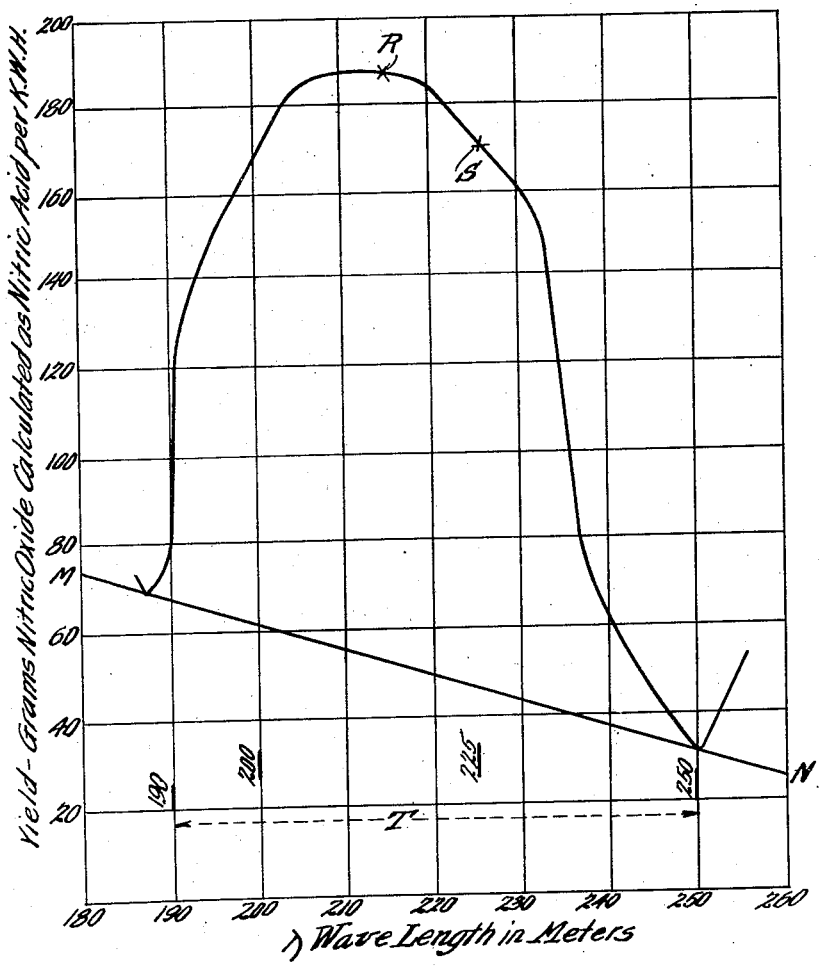

Oct. 18, 1949. W. J. COTTON 2,485,481
ELECTROCHEMICAL PRODUCTION OF NITROGEN OXIDE
Filed June 17, 1949 4 Sheets-Sheet 3

Oct. 18, 1949.  W. J. COTTON  2,485,481
ELECTROCHEMICAL PRODUCTION OF NITROGEN OXIDE
Filed June 17, 1949  4 Sheets-Sheet 4
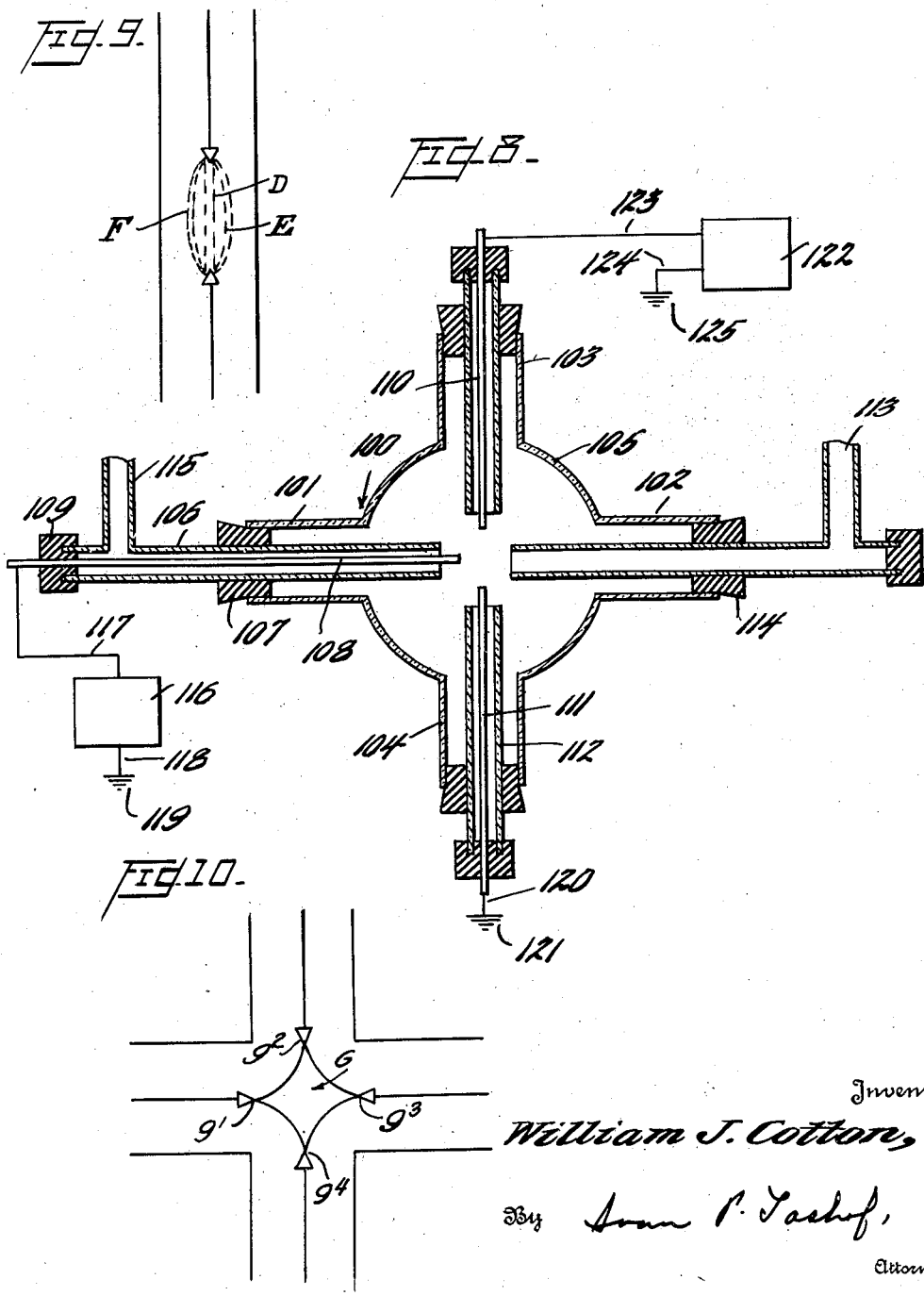
Inventor
William J. Cotton,
By [signature]
Attorney Patented Oct. 18, 1949

2,485,481

UNITED STATES PATENT OFFICE 2,485,481

ELECTROCHEMICAL PRODUCTION OF NITROGEN OXIDE

William J. Cotton, Butler, Pa., assignor to Koppers Company, Inc., Pittsburgh, Pa., a corporation of Delaware Application June 17, 1949, Serial No. 99,816

7 Claims. (Cl. 204—179)

The present invention relates to the production of nitrogen oxide from a gaseous medium consisting principally of nitrogen and oxygen gases in a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode. The electrochemical transformation of the gaseous medium is carried out in the presence of a copper-lithium alloy or a nickel-lithium alloy of the character herein set forth. The gaseous medium is electrochemically transformed by subjecting the same to the action of a composite cyclic luminous electrical discharge produced by the interaction of a plurality of separate cyclic electrical discharges differing in energy quantum, each of said discharges emanating from separate high potential electrodes, said discharges being hereinafter more particularly described.

A single electrode or electrode terminal, or a plurality of electrodes or electrode terminals may comprise a metallic alloy containing lithium in an amount which will function to increase the yield of nitrogen oxide. The electrode alloy material may comprise a copper-lithium alloy, a nickel-lithium alloy, or other metallic alloys, it being one of the inventive thoughts of the present invention to obtain the benefit of lithium in all alloys with which lithium will alloy. The electrodes and/or the electrode terminals may comprise binary alloys containing lithium in an amount which will increase the yield of the transformed product, and, more specifically, alloys with a lithium content up to 5%. Moreover, the electrodes and/or electrode terminals may comprise ternary alloys, as, for example, a copper-calcium-lithium alloy, the calcium being present preferably in an amount of 2% and the lithium in the amount of 2%. Most desirably, the electrode or the electrode terminal, or the electrode surface may contain at least 1% to 5% of lithium. The electrode terminal may comprise an alloy of copper containing 2% to 4% of lithium, or an alloy of copper, silver, and lithium in which the lithium is present in an amount up to 5%. The electrode again may consist of a lead-lithium alloy in which the lithium may be present up to 10% or more. The alloys of the character set forth may be used for a single electrode terminal or a single set of electrode terminals, or for both sets of electrode terminals.

In accordance with the present invention, gaseous material may be electrochemically transformed by introducing said material into a reactor provided with a plurality of electrode terminals from which emanate crossed electrical discharges generated by separate cyclic electrical energies, at least one of said discharges being generated by a cyclic energy quantum equivalent to a sinusoidal frequency between about 1.58 mc. (190 meters) and about 1.20 mc. (250 meters), and preferably between about 1.50 mc. (200 meters) and about 1.33 mc. (225 meters). This frequency may be used in connection with any electrode material which has a critical electrode frequency within the indicated range such as, for instance, copper-lithium alloys and nickel-lithium alloys, for the transformation of nitrogen-and oxygen-containing gaseous medium to nitrogen oxide. However, in the preferred form of the invention, this wave band, both in its broad range and in its specific range, is used preferably when the reactor is provided with a plurality of crossed electrodes and/or electrode terminals from which emanate crossed electrical discharges, at least one of said electrodes and/or electrode terminals comprising a metallic lithium-containing alloy, the lithium being present in an amount which will increase the yield of the finally transformed product, this usually being up to about 5% lithium, although the lithium content may, in some cases, be greatly increased, as, for instance up to 10% or 15%. While in most cases the alloys now available contain only from about 2% to 5% of lithium, it is recognized that alloys of greater lithium content may be used to provide the electrode and/or electrode terminals of the reactor herein set forth. In this connection, the non-lithium component of the alloy may be any material which has a critical electrode frequency within the above noted range and which is reasonably resistant to oxidation at those temperatures prevailing in the reactor used in carrying out the present invention. The non-lithium component is preferably copper or an alloy thereof, or nickel, or an alloy thereof because these metals exhibit critical electrode frequences within the above range. When a third element is introduced into the alloy, as for example, when silver is introduced into the copper-lithium alloy, the percentage of lithium that may be alloyed with the copper is greatly increased. As herein set forth, copper-silver-lithium alloys may be used where the lithium content is from 2% to 5% and the silver is present in an amount varying from 2% to 3%, the balance of the alloy being copper.

The present invention is especially valuable in the production of nitrogen oxide from a nitrogen-and-oxygen-containing gaseous medium. In one form of the invention, a nitrogen-and-oxygen-containing medium, such as air, may be subjected to the action of a plurality of crossed electrical discharges, one of said discharges being generated by a cyclic energy quantum equivalent to a sinusoidal frequency between about 1.5 mc. (200 meters) and about 1.20 mc. (250 meters), and preferably generated by a cyclic energy quantum equivalent to a sinusoidal frequency lying between the limits of 1.53 mc. to 1.50 mc. (195 to 200 meters) and a limit of about 1.33 mc. to 1.28 mc. (225 to 235 meters). While good results are obtained operating with crossed discharges when one of the crossed discharges is generated by a cyclic energy quantum equivalent to a sinusoidal frequency between about 1.50 mc. (200 meters) and about 1.33 mc. (225 meters), this operating range may be somewhat enlarged and still excellent yields obtained, as will be clear from the examination of Fig. 5 of the drawing. In other words, increased yield is obtained when operating between the limits of about 1.53 mc. (195 meters) and about 1.28 mc. (235 meters).

It is an object of the present invention to produce nitrogen oxide by subjecting a nitrogen-and-oxygen-containing-medium to the action of crossed electrical discharges, at least one of said discharges being generated by a cyclic energy quantum selected from the peak wave band frequencies herein set forth.

It is a specific object of the present invention to produce nitrogen oxide in accordance with the method herein set forth wherein at least one pair of electrode terminals is provided with a lithium component functioning to increase the magnitude of the yield of the electrochemically transformed product.

It is a further object of the present invention to economically and efficiently produce nitrogen oxide from a nitrogen-and-oxygen-containing medium utilizing a cyclic energy quantum selected from the peak wave bands herein specifically set forth, and particularly a cyclic energy quantum lying between the quantum limits corresponding to sinusoidal frequencies of about 1.53 mc. (195 meters) and 1.28 mc. (235 meters), and in its more specific form corresponding to sinusoidal frequencies between the limits of about 1.50 mc. (200 meters) and about 1.33 mc. (225 meters). Under these conditions satisfactory yields of nitrogen oxide are obtained when a nitrogen-and-oxygen-containing medium is treated in accordance with a broad and specific method herein referred to.

The oxygen-and-nitrogen-containing medium is preferably introduced into a reactor provided with crossed electrodes, at least one of said electrodes having as its operative electrode portion any of the electrode or electrode terminal materials herein set forth. However, as indicated, the preferred operative electrode portion of the electrode is a lithium-containing alloy containing from .2% to 5% of lithium, the lithium being preferably alloyed with copper in amounts between .2% and 4.8%, the alloy in some instances containing a third metal in amounts herein set forth, said third metal increasing the amount of lithium which may be alloyed with the alloy base such as copper, nickel and the like.

It is desired to point out that under the conditions herein set forth, and especially under the conditions previously referred to, chemical compounds generally may be transformed in the presence of crossed discharges using a low frequency current and a high frequency current having a frequency within the wave band limits herein specifically set forth.

The present invention may be carried out in any of the forms herein set forth wherein each of said electrical discharges is generated by a separate cyclic electrical energy quantum, each of said discharges emanating from a separate high potential electrode, at least one of said discharges having an energy quantum capable of producing peak yields of transformed products, and especially peak yields of nitrogen oxide from a nitrogen-and-oxygen-containing medium in the presence of a metallic lithium alloy electrode, or electrodes, or electrode terminals of the same alloy, and preferably a copper-lithium alloy electrode, or electrodes or electrode terminals of the same alloy.

The present invention will be disclosed in connection with the accompanying drawing, in which Fig. 1 is a cross-sectional view of a reactor apparatus capable of generating crossed discharges of the character herein described;

Fig. 2 is a transverse cross-sectional view taken on the line 2—2 of Fig. 1;

Fig. 3 diagrammatically sets forth the connections of the high frequency electrodes to the generator and tank circuits and the low frequency electrodes to the source of low frequency energy;

Fig. 4 is a diagrammatical representation of an apparatus for drying the air prior to its introduction into the reactor, and for absorbing the nitrogen oxide content of the exit reaction gases;

Fig. 5 is a graph depicting the results obtained when using the reactor set forth in Fig. 1. The abscissa indicates wave length, lambda, in meters, and the ordinate indicates the yield in grams of nitric acid per kilowatt hour assuming a power factor of 1.00;

Fig. 6 sets forth the hook-up of the high frequency generator unit used for producing the high frequency energy supplied to the tank circuit which connects the generator with the reactor;

Fig. 7 sets forth the tank circuit used in conveying electrical energy from the generator to the reactor;

Fig. 8 is a modified form of a reactor apparatus in which one of the electrodes serves as a common ground;

Fig. 9 diagrammatically depicts the volume and shape of D, a low frequency discharge; E a high frequency discharge correspondinging in frequency to a base line frequency; and F a high frequency discharge corresponding in frequency to a critical frequency;

Fig. 10 diagrammatically displays the shape and volume of the cyclic electrical discharge emanating from electrodes positioned at an angle to one another and preferably at an angle from 45° to 90°. The discharges which emanate from the electrodes intersect and merge as they leave the electrodes to produce an electrical discharge having approximately the shape and volume shown.

The reactor apparatus shown in Fig. 1 comprises a hollow reactor vessel 1 made of non-conducting or insulating material, such as ceramic material, including glass, and preferably a high melting glass, including borosilicate glass known as "Pyrex." The reactor is provided with what are herein termed "leg members" 2, 3, 4 and 5 provided respectively with apertured insulating closure members 6, 7, 8 and 9, each of said closure members having mounted therein sheath members 10, 11, and 12 and 13 respectively. Each of said sheath members at their respective outer ends are closed by apertured closure members 14, 15, 16 and 17 respectively. Passing through the sheath members 10 and 11 and mounted in the end closures 14 and 15 respectively are low frequency electrodes 18 and 19 provided with alloy electrode terminals 20 and 21 consisting of a lithium-containing alloy, as, for example, a copper-lithium alloy or a nickel-lithium alloy, or alloys of lithium with other metals, as herein broadly and specifically set forth. Certain runs are herein set forth, and in these runs the reactor was equipped with electrodes, the operative electrode portions of which; that is, the electrode terminals, comprised an alloy of copper and lithium, the latter being present in the amount of about 2%.

Very satisfactory results may be obtained by having the electrodes 18 and 19 and terminals 20 and 21 integral with each other and made of copper-lithium alloy wire, or in the form of a copper-lithium alloy rod. However, it is within the province of the present invention to make electrode terminals of any of the electrodes herein set forth removable to thereby provide for the replacement of burnt-out electrode terminals with new terminals. Passing through the sheath members 12 and 13 and mounted in the closure members 8 and 9 respectively are high frequency electrodes 22 and 23, said electrodes being provided with copper-lithium alloy terminal members 24 and 25 respectively, said electrode terminals or tip members being preferably pointed. These low frequency electrodes, together with their accompanying electrode terminals, may be in the form of integral copper-lithium alloy wire or rod, pointed at its inner end to thereby provide the copper-lithium electrode point. The reactor is provided with an inlet member 26 and an exit member 27.

The electrode 23 serves as a hot or high potential electrode in the tank circuit herein set forth, while the electrode 22 passes to ground via a milliammeter, as shown in Fig. 3. The low frequency electrodes 18 and 19 connect with the terminals of the high voltage transformer 30 yielding 60 cycles, and in said circuit a high voltage voltmeter and milliammeter are placed in the usual manner. The high voltage transformer 30 is protected against possible shorts from the high frequency circuit in the reactor by inserting appropriate choke coils 28 and 29 between the low frequency electrodes and their connection to the high voltage low frequency circuit as shown in Fig. 3.

The high frequency electrode 23 is connected to lead 31, said lead and electrode being an integral part of the tank circuit shown in Fig. 3 and more specifically in Fig. 7.

The gaseous component to be treated in the reactor set forth in Fig. 1, after being dried in the apparatus set forth in Fig. 4 in the manner hereinafter described, enters the reactor through the inlet member 26, passes through the sheath member 10 around the electrode terminal and through the composite crossed discharge. The reaction product passes through the sheath 11 and leaves the latter by means of the exit conduit 27. The reaction product passes through a medium for extracting its nitrogen oxide content, the precise method of extraction being hereinafter set forth in connection with the description of Fig. 4.

While, as stated, it is preferred to have the electrode terminals pointed, it is within the province of the present invention to use buttons, nodules, globules, or to have the electrode terminals in any other shape hitherto used in the treatment or electrochemical transformation of chemical products. The sheath members may, under some circumstances, be omitted, but it is highly desirable to retain them in order to force the flow of a gaseous medium being subjected to the action of the crossed discharge in and around electrode terminals. Further, it may be stated that the sheath members function to a substantial extent to protect the outer vessel from the effect of heat which may be produced during the course of the reaction in the reactor. It is preferred that the electrode terminals 20, 21, 24 and 25 project beyond the interior ends of the sheath members in order to avoid undue heating which may induce generation of sodium and other undesirable ions which tend to generate side reactions.

The following is a specific example, identified as Example I, illustrating the production of nitrogen oxide from atmospheric air using the reactor set forth in Fig. 1, there being produced peak yields of nitric oxide under the specific operating conditions.

The diameter of each leg of the reactor vessel is 32 mm. and the inner sheaths are 23 mm. in diameter. The overall length of the reactor 1 is approximately 10 inches. In starting the apparatus, the flow of dried air is initiated through the inlet tube 26, said air passing through the reactor legs at a velocity of approximately 475 cc. per minute under standard conditions. The pressure within the reactor is maintained at approximately 327 mm. mercury pressure. There is applied to the high frequency electrode terminals 24 and 25 high frequency energy having a potential voltage, before striking, of approximately 1700, said voltage dropping immediately on striking the discharge to 400 volts, with a corresponding current of 35 milliamperes. The high frequency energy is applied at a frequency of 1.39 mc. (215.0 meters). The high frequency gap between electrode terminals 24 and 25 is 27 mm.; and the low frequency gap between electrode terminals 20 and 21 is 37 mm. After applying the high frequency energy, there is applied to the low frequency electrodes 20 and 21 the high voltage low frequency current having a frequency of 60 cycles applied under a potential of approximately 2,000 volts, which immediately drops to 750 volts, the latter being accompanied by a current of 25 milliamperes. The high frequency energy thus corresponds with 14 watts, whereas the low frequency energy corresponds with 18 watts, the total being 32 watts, of which approximately 43% is high frequency energy.

The reaction products produced under the above conditions are absorbed by passing through silica gel as hereinafter set forth in detail, and the silica gel showed an increase in weight for a five minute run of 236.6 mg. of nitrogen oxide. This corresponds to a yield of 186.7 gms. of nitric acid per kilowatt hour. This yield appears on the graph of Fig. 5 as point R.

The following is an additional example, identified as Example II, setting forth the production of nitrogen oxide from atmospheric air using the reactor set forth in Fig. 1.

In starting the apparatus, the flow of dried air is initiated through the inlet member 26, said air passing through the reactor at a velocity of 473 cc. per minute under standard conditions. The pressure within the reactor is maintained at approximately 326 mm. mercury pressure. There is applied to the high frequency electrode terminals 24 and 25 high frequency energy having a potential voltage, before striking, of approximately 1800 volts, said voltage dropping immediately on striking the discharge to 400 volts with a corresponding current of 25 milliamperes. The high frequency energy is applied at a frequency of 1.33 mc. (225.0 meters). The high frequency gap between the electrodes 24 and 25 is 27 mm. and the low frequency gap between the electrode terminals 20 and 21 is 37 mm. After applying the high frequency energy, there is applied to the low frequency electrodes 18 and 19 a high voltage low frequency current having a frequency of 60 cycles applied under a potential of approximately 2,000 volts which upon striking immediately drops to 1250 volts, the latter being accompanied by a current of 15 milliamperes. The high frequency energy thus corresponds with 10 watts whereas the low frequency energy corresponds with 18 watts, the total being 28 watts, of which approximately 35% is high frequency energy.

The reaction products produced under the above conditions are absorbed by passing through the silica gel, as hereinafter set forth in detail, and the silica gel showed an increase in weight for a 5 minute run of 188.9 mg. of nitrogen oxide. This corresponds to a yield of 170.0 grams of nitric acid per kilowatt hour. This yield appears on the graph of Fig. 5 as point S.

Additional runs were made in the reactor of Fig. 1, the electrode terminals all comprising a copper-lithium alloy having 2% lithium present at wave lengths varying between 184 and 256 meters and within this length there was found, as indicated in Fig. 5, the peak band T within which there was obtained a peak yield. This band ranged between about 190 and about 250 meters and more specifically between about the limits of about 195 to 200 meters and about 225 to 235 meters.

The graph set forth in Fig. 5 was obtained by operating as in Examples I and II, the only significant factor varied being the frequency as measured in meters. Within the range of 184 to 256 meters, runs were made at intervals of 4 or 5 meters along the abscissa. The results of this series of experiments are plotted as the curve of Fig. 5.

It is desired to point out the following considerations:

The line M—N drawn through the low points is known as the base line. Having set forth the actual steps of the present invention in compliance with the patent statutes, without being limited as to theoretical considerations, it is here advanced that the yield below the base line M—N is the result of purely thermal collisions as has heretofore been accepted as the general explanation of reactions in the electrical discharge, but that reaction products produced within the area of the peak bands but above the base line M—N, are due to activation of nitrogen by resonant absorption of energy, probably also of a collision species. The total yields within the peak band ranges are the additive sum of the reaction produced by thermal collisions and the reaction produced by resonant activation. Further, the proportionate contribution of each of these at any specific wave length within a peak band range is the proportionate ratio of the fraction of the total ordinate that lies above the base line M—N and that fraction of the total ordinate which lies below the base line M—N.

It is desired to point out that the maximum yield of nitrogen oxide, as shown on the graph of Fig. 5, said yield occurring when a cyclic electrical energy is used corresponding to a sinusoidal frequency between about 1.58 mc. (190 meters) and about 1.20 mc. (250 meters), and preferably between about 1.50 mc. (200 meters) and about 1.33 mc. (225 meters), is obtained with copper-lithium electrodes and under the conditions specified in examples I and II. It may be pointed out that the copper-lithium alloy used in producing the curve set forth in Fig. 5 analyzed approximately 98% copper and 2% lithium.

The examples herein set forth and the graph depicted in Fig. 5 are based on the use of electrodes made of an alloy containing about 98% copper and 2% lithium, this being the commercially available alloy at the present time. It is not intended, however, to limit the scope of the present application to metal alloys containing only 2% lithium. Not only may copper alloys be used, but other alloys containing lithium, as, for example, nickel alloys may be used in carrying out the present invention, the inventive thought of the present invention being to obtain the benefit of lithium in all alloys with metal having critical electrode frequencies lying within the herein set forth range of frequencies. Not only may binary alloys be used, but ternary alloys may be used, as, for example, a copper-calcium-lithium alloy, the calcium being present in the amount of 2% and the lithium in the amount of 2%.

The air which is introduced into the reactor 1 is dried prior to the introduction into the reaction vessel by passing it through soda lime tubes A Fig. 4, then through the silica gel tube B, thence through the conduit C, through the orifice D of the differential manometer E, through the valve F, and thence to the reactor 1. At the point H is the mercury manometer G which measures the internal pressure of the reactor. From the reactor 1 exit gases through exit conduit 27 to a series of silica gel absorber tubes J, which tubes extract the nitrogen oxide content of the exit gases. A vacuum is supplied by means of the vacuum pump K and the amount of vacuum adjusted by means of the release valve L and the main valve F in the supply line. The soda-lime functions not only to take out a portion of the moisture but also to extract from the air substantially all of the carbon dioxide. The air, as delivered to the reactor 1, has a moisture content of about 5 to 8 mg. of moisture per liter. When the run is started, the valves $V^2$ and P are closed and $V^1$ and O are open. When operation has reached equilibrium, valves $V^2$ and P are quickly opened and valves $V^1$ and O are closed, noting the time of doing so with a stopwatch. Upon conclusion of the run, valves $V^1$ and O are opened, while valves $V^2$ and P are closed.

The time interval in which the valves $V^2$ and P are open to the absorbers and the valves $V^1$ and O of the bi-pass are closed is five minutes. During this period the silica gel is absorbing the nitrogen oxide produced by the reaction. After the run is terminated, the silica gel tubes are weighed and the increase in weight taken as the weight of the nitrogen oxide produced in five minutes.

The low frequency cyclic electrical energy quantum may vary from that of the lowest producible sinusoidal frequency, including 10 and 25 cycles to about 3000 mc. This corresponds to a variation in wave length from about 30,000,000 meters (10 cycles per second) to 10 centimeters (3,000 mc.). The low frequency may be generated by a cyclic energy quantum corresponding to or equivalent to a sinusoidal frequency between about 10 cycles per second and 50,000 cycles or 100,000 cycles per second. Frequencies between 10 cycles per second and 10,000 cycles per second may be used as the lower frequency.

It is desired to point out that in producing nitrogen oxide by subjecting a nitrogen-containing gas such as air or its equivalent to the action of a crossed composite discharge, the energy contributed by the high frequency component is desirably 4% or more of the total energy supplied to both the low frequency and the high frequency electrodes, and may vary between 4% and 65%. In some cases the percentage of high frequency energy supplied during the reaction period may vary from 25 to 65% and satisfactory results have been obtained when it averages 35%.

It is desired to point out that by crossing low frequency and high frequency discharges the volume of the visible composite discharge per unit of total energy supplied is greatly increased; that is, the energy density in watts per cubic centimeter is greatly decreased. Stated differently, the composite discharge fills a larger volume than either discharge alone when supplied with energy equal to the total energy supplied to the crossed discharges.

In connection with the above, attention is directed to Figs. 9 and 10 of the drawing. Referring to Fig. 9, there is diagrammatically illustrated the volume of the luminous discharge formed when using uncrossed discharges, the discharge volume D representing the discharge volume produced by subjecting the gas, such as a mixture of nitrogen and oxygen, in which the nitrogen predominates, to the action of low frequency energy typified by 60 cycles. Using, for example, a frequency of 1.57 mc. (190 meters), or 1.20 mc. (250 meters), both of which are base line frequencies, the luminous discharge of relative volume E will be obtained, said discharge volume being larger than the discharge volume D. However if a frequency approximating a critical electrode frequency of such as 1.39 mc. (216 meters), for copper is used, a still larger discharge volume will be obtained, this volume being diagrammatically indicated in Fig. 9 by the letter F. In other words, the discharge volumes D, E, and F progressively increase. In all cases the frequencies recited were used alone, that is, were not crossed with another frequency and, further, in the experiments above set forth minimum sustaining energy was used. By minimum sustaining energy is meant that energy obtained by multiplying volts, amperes and power factor, and which is just sufficient to maintain the luminous discharge between the electrodes without fluttering.

Referring to Fig. 10, this figure diagrammatically illustrates what happens to the volume of the discharge when two frequencies are crossed. The discharge volume G set forth in Fig. 10 is included within the area $g^1$, $g^2$, $g^3$ and $g^4$. This discharge volume is obtained by crossing sixty cycles with a non-critical reaction frequency as, for example, 190 meters or 250 meters. This discharge volume G is therefore greater than the discharge volume D, or the discharge volume E, when the total energy supplied to the crossed discharge is the same as the electrical energy supplied to produce discharge D or E. The above statement means, from the standpoint of energy density, that the energy density, i. e. volt-amperes per cubic centimeter, continuously decreases in passing from the operating conditions of D to the conditions of E, to the conditions of F and then to the conditions of G, a power factor of 1.0 being assumed. The crossing of the discharges in all cases decreases the energy density of the discharge volume, or inversely, increases the volume of the discharge, or both. The above indicates that the crossing is highly advantageous. Further, the best results are obtained when there is a substantial difference in wave length, or energy quantum between the higher frequency energy and the lower frequency energy. When the difference between the energy components is at least 65,000 cycles per second, the increase in yield becomes significantly apparent, and at a difference of 100,000 cycles per second, as set forth in application Serial No. 546,882, filed July 27, 1944, the increase in yield is still more significant, and at a difference of 200,000 cycles per second, as set forth in application 553,426, filed September 9, 1944, the yield is further increased. As the difference in energy quantum or frequency increases between the higher frequency energy or current and the lower frequency energy or current, more advantageous yields are produced by the crossing of the discharges. The energy density may be measured in watts per cubic centimeter or joules per cubic inch.

It is well known that a specific sinusoidal frequency has a definite energy quantum content, and that, given the particular frequency or particular wave length employed, the energy quantum or the energy content thereof may be easily obtained.

In order to convert a given sinusoidal frequency into its equivalent quantum energy, all that is necessary is to multiply the given frequency by Planck's constant, which is $6.554 \times 10^{-27}$ erg-seconds.

The relationship between energy quantum expressed in ergs, frequency, and wave length is set forth by the following formula:

$$E \text{ (ergs)} = hf = \frac{k}{\lambda}$$

where $k = 1.967 \times 10^{-18}$
$h =$ Planck's constant
$f =$ frequency
$\lambda =$ wave length in meters said interrelationship being well known in the literature and is also set forth in said co-pending application Serial No. 790,568.

The constant "$k$" is merely the quantum energy of 300 mc. (1 meter) sinusoidal wave and is obtained in the usual manner by multiplying Planck's constant ($6,554 \times 10^{-27}$) by 300 mc. ($3 \times 10^8$), the resulting figures being $1.967 \times 10^{-18}$.

As shown in Fig. 1, the crossed electrodes are all in the same plane, and said plane may be a vertical plane, a horizontal plane, or any intermediate plane. It is within the province of the present invention, in its broad aspects, to supplement the four electrodes, as shown in Fig. 1, by an additional pair of low frequency electrodes. The additional pair of low frequency electrodes may have the same low frequency energy passing therethrough as that which passes through the electrodes 18 and 19; or the additional pair of electrodes may utilize the same frequency as that passing through the high frequency electrodes 22 and 23; or the additional pair of electrodes may use a lower frequency than that passing through the low frequency electrodes 18 and 19; or a frequency intermediate that passing through the low frequency electrodes 18 and 19 and the high frequency electrodes 22 and 23.

In producing nitrogen oxide, air may be enriched with oxygen and, within limits, the yield will be somewhat increased over the yield of nitrogen oxide produced when only air is electrochemically transformed in accordance with the present invention. Air may be enriched so that it has up to 50% of oxygen, and when so enriched this enrichment will produce an increase in yield of nitrogen oxide of about 10%.

Fig. 6 sets forth the hook-up of the high frequency generator unit used for producing the high frequency energy supplied to the tank circuit connecting the generator to the reactor. The diagram may be divided into five circuits 32, 33, 34, 35, and 36. Circuit 32 is the full wave rectification unit wherein the leads 37 connect to the 110 volt 60 cycle supply on the panel board. The numeral 38 identifies a transformer delivering its secondary high voltage current to the rectification tubes 39 and 40, the filaments of which are heated by current generated in the filament transformer 41. The resistor 42 and fixed condensers 43 and 44, together with the choke coil 45, constitute a filter. The high voltage D. C. current produced by this circuit leaves same by means of the ground connection 46 via the milliammeter 47 and the lead 48, which delivers to the plates of tubes 49 and 50 of the oscillator circuit 33. The transformer 51, connected with the 110 volt supply, provides the filament power for the tubes 49 and 50. The desired frequency is obtained by means of tuning the oscillator circuit 33, such tuning being effected by operation of the variable condenser 52 and the inductance 53.

In carrying out the work described as above set forth between the limits of wave lengths of 190 meters or 1.58 mc., and 250 meters or 1.20 mc., it is necessary to change the size of the inductance 53 by steps. This is done by removing one inductance and replacing same with another inductance having the desired characteristics.

It will be noted that this hook-up does not utilize the usual link circuit for connecting the oscillator circuit 33 with the power amplifier circuit 35. Instead of the link circuit, the oscillator circuit 33 is directly connected to the power amplifier circuit 35 through the two fixed condensers 54 and 55. These condensers 54 and 55 couple the oscillator circuit 33 to the grid in-put circuit 56 of the power amplifier circuit 35. The grid circuit of the power amplifier is tuned by means of the variable condenser 57, and by changing inductance coils 58 in a manner similar to the change effected in inductance 53, as necessary to meet requirements. The choke coils 59 and 60 in the grid circuit of the power amplifier serve to keep the radio frequency energy from entering the grid bias circuit 36 while forming a low resistance path for the negative grid bias D. C. voltage. Radio frequency energy from the oscillator circuit 33 is applied to the grids of the power amplifier tubes 61 and 62 which are supplied D. C. power through the lead 63 from the power rectification circuit 34. Condensers 64 and 65 are neutralizing condensers which balance out the internal grid-plate capacities of the power amplifier and prevent self-oscillation of the power amplifier. Transformer 66 supplies filament power for tubes 61 and 62, condensers 67 and 68 by-passing the radio frequency currents to the ground.

The tubes 61 and 62 amplify power provided by circuit 34, imparting thereto the frequency developed by oscillator tubes 49 and 50. Transformer 69, connected with a 110 volt supply, provides the energy to the power supply rectification tubes 70 and 71. The transformer 72, also connected with a 110 volt supply, provides the power for the filaments of tubes 70 and 71. It will be observed that circuit 34 is essentially similar to circuit 32. The combination of the choke 73, fixed condenser 74 and resistor 75 constitute a filter. The rectified power leaves the circuit via the milliammeter 76 to ground and the lead 63 to the power amplifier circuit 35. The choke coil 77 in the lead of 63 confines the radio frequency energy to circuit 35, while providing a D. C. path for the plate supply voltage through lead 63. The voltage at which it is delivered is measured by the voltmeter 78. Likewise, the voltage delivered to the oscillator circuit 33 from circuit 32 is measured by voltmeter 79.

Circuit 36 is the D. C. bias supply which supplies a negative voltage to the grids of the tubes 61 and 62 of the power amplifier circuit 35. The numeral 80 designates a split transformer supplying power to the plates of the full wave rectification tube 81. The choke coil 82, condensers 83 and 84, together with resistor 85, constitute a filter. The positive terminal of this supply is grounded at 86, the negative voltage being supplied to the grids of the power amplifier tubes 61 and 62 by means of lead 87 via milliammeter 88.

The power amplifier circuit 35 is tuned to the desired frequency as generated by means of oscillator tubes 49 and 50 of the oscillator circuit 33 by means of the variable condenser 57 and the inductance 58. The inductance 58 is varied by means of changing coils to meet various wave length requirements as is done in the case of inductance 53. The power amplifier 35 thus tuned and supplied by D. C. power from circuit 34 transmits the amplified high frequency energy to the coupling circuit 89, which in turn delivers it to a tank circuit such as is shown in Fig. 7.

Fig. 7 represents a tank circuit of the type known as end grounded. The portion of the coupling circuit shown as 90 leads to and is a part of the coupling circuit 89 of Fig. 6 and it is placed at the end of the inductance 91. It will be noted that in this type of tank circuit the ground 92 is at the end of the tank coil 91 instead of in the middle 93, as would be the case had the tank circuit been of the center grounded type. The coupling circuit 89—90 serves merely to transfer the high frequency energy from the generator set to the tank circuit proper. The point 94 is the location of the discharge. Tuning of this tank circuit to the generator is carried out by use of the variable condenser 95 by changing inductance coil 91 as was done with inductances 53 and 58 to meet requirements. The circuit conductors 96 are preferably of copper tubing. A thermomilliammeter is located at 97 and a high frequency voltmeter at 98. The circuit is grounded at 92.

In the example set forth, the rate of flow of air through the reactor is about 475 cc. per minute. It is important, in connection with the rate of air passing through the reactor vessel, to supply sufficient air per minute, so that the maximum yield for the frequency used may be obtained. This means that, operating with different high frequencies, varying minimum rates of flow are required in accordance with the frequency used. When the crossed discharge method is used to electrically transform products, the rate of flow of the material which is flowing through the reactor, which is to be transformed, must be greatly increased for frequencies corresponding with peak yields; and the rate of flow of about 475 cc. per minute represents the proper accelerated rate of flow of air through the reactor to provide peak yields at the preferred peak frequency bands herein set forth.

The crossed discharge possesses properties that are characteristic thereof, but the crossed discharge in the reactor may also partake of the nature of the glow, corona, or spark type. If the pressure at which the reaction is carried out is above about one-half an atmosphere, the discharge tends to increasingly partake of the nature of either a corona or spark discharge, but at pressures below about atmosphere, some of the characteristics of a glow discharge begin to appear and become increasingly pronounced as the pressure decreases. This pressure may be decreased until it approaches a complete vacuum as a lower limit. When using crossed discharges, the discharge frequently partakes of the character both of a glow and a corona discharge. The usual glow discharge usually is non-existent above a pressure of about 1 centimeter of mercury. Properly adjusting the frequency for a particular medium which is being electrically transformed, the reactors herein set forth using crossed discharges may be operated to give a discharge possessing certain characteristics of the glow or the corona discharge above about one-half an atmosphere pressure while below about one-half an atmosphere pressure characteristics of either the glow or the corona discharges appear superimposed over the normal characteristics of the crossed discharge.

By "glow discharge" is meant a discharge which consists of a soft diffusion of light throughout the entire volume of space between the electrodes. This may be, although not necessarily, simultaneously accompanied by an almost complete lack of incandescence of the electrodes themselves. A true glow discharge does not have a definite boundary, as is characteristic of both the corona discharge and the crossed discharge. The glow is not usually of uniform intensity throughout the entire volume between the electrodes, the intensity being greatest along the axis between the electrodes and tapering off gradually to the confines of the reactor tube.

If the energy supplied be increased, the electrodes will become incandescent without appreciably affecting the glow characteristics of the discharge. It has been learned that the excess energy thus supplied is almost wholly dissipated as thermal energy.

While the cyclic energy is stated to be supplied to the high frequency electrodes at a voltage of about 800 volts and to the low frequency electrodes at about 1100 volts, it is desired to point out that this is merely illustrative and not by way of limitation, as the voltages of the respective cyclic energies will vary in accordance with the number of conditions, including the length of the discharge desired, the pressure used, the composition of the gas being reacted and the composition of the electrodes utilized in carrying out the invention. The voltage may be as much as 2500 volts, but in a fairly good sized reactor capable of at least semi-commercial exploitation the voltage of both frequencies will vary from 5,000 to 10,000 volts and preferably from 5,000 to 7,000 volts, and in that case the gap between the electrodes may be in the neighborhood of 5 to 10 inches, and preferably 5 to 7 inches. Here again, these figures are merely illustrative and are set forth to indicate that the voltage may be varied over wide limits depending upon the conditions of operation.

Instead of employing the reactor set forth the reactor may be of the character shown in Fig. 8 wherein the reactor is provided with crossed electrodes, one of said electrodes being common ground electrode through which both of the crossed discharges pass to the ground. The reactor shown in Fig. 8 comprises a reactor vessel 100 provided with horizontally extending members 101 and 102 and vertically extending members 103 and 104, the latter projecting from the spherical shaped member 105. Extending through the horizontal member 101 is a sheath-like member 106 which is mounted in an insulating closure 107. Projecting within the sheath member 106 is a low frequency electrode 108, the latter being mounted in an insulating closure 109 which also acts as a closure for the sheath 106. The electrode 110 is a high frequency electrode. A common ground electrode 111 is provided, said electrode being surrounded by a sheath 112. The reactor vessel is provided with an inlet conduit 113, the latter being mounted in a closure member 114. The apparatus is provided with an exit conduit 115. The electrical energy passing through low frequency electrode 108 is furnished by the generator 116 from which the lead 117 connects with the electrode 108 and the lead 118 is connected to ground 119. The low frequency energy passing through the discharge and out through the electrode 111 passes through the lead 120 to the ground 121. The high frequency energy is supplied by the generator 122, one lead 123 thereof being connected to the high frequency electrode 110 and the other lead 124 being connected to ground 125. The high frequency energy, after passing through the discharge and out through the electrode 111, passes by means of lead 120 to ground 121.

A reactor of this character may be provided with low frequency copper-lithium, nickel-lithium, or other lithium alloy electrodes, and the common electrode may be of the same alloy material or a different alloy material; or all of the electrodes may comprise copper-lithium alloys of the character herein set forth, or nickel-lithium alloys.

It is also within the province of the present invention to utilize a reactor of the character set forth in U. S. Patent No. 2,468,173 which matured upon application Serial No. 485,058, co-pending with parent application, Serial No. 511,146, of which the present application is a continuation-in-part.

While, preferably, in carrying out the present invention in all of its forms, it is desirable to use an alloy of copper and lithium, yet lithium may be combined or alloyed with any other material, such as nickel which has a critical electrode frequency within the range of cyclic electrical energy quanta herein set forth, the critical electrode frequency for nickel being 212.6 meters.

It has been pointed out in prior applications that increased yields are obtained using nickel electrodes or electrode terminals, not only when the electrodes are crossed but also when a nitrogen- and oxygen-containing medium is supplied to a reactor provided with a single set of nickel electrodes through which a high frequency current of the character herein set forth passes, namely, a high frequency current lying within the cyclic electrical quantum energy limits herein set forth.

It is within the province of the present invention to use cyclic electrical quantum energy corresponding to a sinusoidal frequency between about 1.58 mc. (190 meters) and about 1.20 mc. (250 meters) and preferably between about 1.50 mc. (200 meters) and about 1.33 mc. (225 meters), in any of the reactors herein referred to, and using any of the herein set forth materials.

While, as shown in the drawing, each electrode is perpendicular to the other electrode and the set of low frequency electrodes is positioned at an angle to the high frequency electrode, each electrode may be positioned at other angles and the set of high frequency electrodes may be positioned at an angle to the set of low frequency electrodes.

While the electrodes and/or electrode terminals herein set forth are preferably made of metal alloys containing lithium, it is also within the province of the present invention to use any alloys of the character herein set forth in which there is present, in lieu of the lithium, a small amount of an alkaline earth metal, as, for example, calcium, barium or strontium, said materials being present in an amount up to about 4% and preferably between 1.5% and 3.0%, taken on the weight of the alloy. For example, the electrode portion may comprise an alloy of copper and calcium, the calcium being present in the alloy in the amount of about 1.5%. Alternatively, the electrode alloy may be a ternary alloy in which calcium and lithium are both present in a copper-calcium-lithium alloy as, for example, 1% of calcium and 1% of lithium. Barium may be combined with copper, nickel and the like as, for example, the electrode or electrode terminal may comprise a copper-barium alloy containing about 1% of barium, the balance being copper.

Lithium may be combined with copper and silver, the lithium being present in an amount between from 2% to 5% and the silver being present in an amount varying between about 2% and about 4%, the balance being copper. Likewise, barium, strontium and calcium may be alloyed with copper containing 2% to 4% of silver, the barium being present in an amount varying between about 2.5% and 3%, the balance of the alloy being copper. When using a copper-silver-lithium alloy, the copper may comprise about 90% or up to 93% of copper, the balance of the alloy being silver and lithium, the lithium being present in an amount to increase the yield of the electrically transformed product, this being usually up to 5% of the lithium, and may vary between 0.5% and 5%. For the copper of this silver-lithium-copper containing alloy, there may be substituted brass, bronze and various other materials for a portion of the copper.

Broadly, it is within the province of the present invention to carry out the reactions herein set forth using super-atmospheric pressure, atmospheric pressure, or sub-atmospheric pressure. Desirably, the gaseous medium may be electrochemically reacted while under a pressure between about 150 mm. of mercury and about 725.0 mm. of mercury. The optimum operating range is between about 320 mm. or 325 mm., and about 360 mm. or 365 mm. of mercury.

In carrying out the present invention, sufficient air per minute should be supplied to the reactor vessel so that, at the frequency employed, a maximum yield of the electrochemically transformed product is obtained. It is known in the art that in the electrochemical transformation of gaseous materials, the rate of flow somewhat influences the yield obtained. Those skilled in the art will therefore employ a rate of flow which will produce a maximum yield, this principle, as stated, being well known in the art. However, in general, the crossing of the discharges in itself does produce an increase of yield and the yield is further pyramided by utilizing a copper or nickel alloy. The yield may be further pyramided when the alloy contains a lithium constituent. Therefore, all of these elements contribute to the production of maximum yields which, as stated, may be somewhat influenced by the velocity of the flow of the gaseous material through the reaction vessel.

The utilization of a copper base alloy or a nickel base alloy, in accordance with the present invention, wherein crossed discharges are employed, said base materials containing a small percentage of lithium, normally produce about a three-fold increase in yield. About 2% of lithium appears to give excellent results. The critical electrode frequencies herein set forth are predicated upon the use of substantially sinusoidal frequencies as regards both current and voltage. It is desired to point out that, from the standpoint of the quantum energy involved in the electro-chemical transformation of material as, for example, air, there should be used quantum energy comparable with the quantum energy of the critical frequencies when said frequencies are sinusoidal. In actual practice, these frequencies vary somewhat, sometimes negligibly, from being entirely sinusoidal, especially when carrying out discharge operations. The objective then must be to utilize the distorted wave that is available but which is of such a frequency that said distorted wave may have a cyclic electrical energy quantum which corresponds to the energy quantum of a pure sinusoidal frequency selected from within the critical electrode frequency limits herein set forth and as specifically defined in the claims.

It is desirable to operate the cross discharge method and apparatus at minimum sustaining energy. By "minimum sustaining energy" is meant that amount of energy, preferably supplied in approximately equal amounts by each of the two contributing frequencies, that will just sustain the discharge. If amounts of energy in excess of the minimum sustaining energy are used, the excess electrical energy is converted, not into chemical energy to do useful work, but is wasted by conversion into heat energy, the production of which in turn tends to decompose the produce already formed. Operation above minimum sustaining energy tends to reduce yield. It is clear that, while it is desirable from many standpoints to operate at minimum sustaining energy, it is not absolutely necessary to operate at minimum sustaining energy, the process being entirely operative at or above minimum sustaining energy. In starting the discharge with more than minimum sustaining energy, the discharge may be adjusted to minimum sustaining energy by gradually decreasing the total energy supplied as long as the yield per unit energy increases. When the yield ceases to increase with further reduction of energy supplied, and it may even start to decrease, then, the point of minimum sustaining energy has just been passed.

The present application is a continuation-in-part of the following applications: 483,931, filed April 21, 1943; 511,146, filed November 20, 1943; 526,933, filed March 17, 1944; 779,561, filed October 13, 1947; and 790,568, filed December 9, 1947. Applications 483,931, 511,146 and 526,933 have been abandoned.

What is claimed is:

1. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes comprising a lithium alloy of a metal having an atomic number selected from the group of numbers consisting of 28 to 29, said metal predominating in the alloy, the latter containing 1% to 5% of lithium, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 50,000 cycles per second (6,000 meters).

2. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes being made from a binary alloy of copper and lithium, the lithium being present in an amount up to 5%, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 50,000 cycles per second (6,000 meters).

3. The method of producing nitrogen oxide comprising introducing a gaseous medium consisting principally of nitrogen gas and oxygen gas into a gas discharge apparatus having an assemblage of at least three separately spaced electrodes, two of said elecertodes being high potential electrodes, said assemblage of electrodes being positioned to have a cyclic electrical discharge pass between a pair thereof, one of said pair being a low potential electrode, said electrodes being made from a ternary alloy containing 90% to 93% copper, the balance of the alloy being silver and lithium, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 50,000 cycles per second (6,000 meters).

4. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes being made from an alloy of copper and lithium and silver, the lithium being present in an amount varying from 2 to 5%, the silver being present in an amount varying from 2 to 5%, and the balance being copper, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 50,000 cycles per second (6,000 meters).

5. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes being made from a binary alloy of a metal having an atomic number selected from the group of numbers consisting of 28 to 29, said metal containing 2% of lithium, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 50.000 cycles per second) (6,000 meters).

6. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes comprising a lithium alloy of a metal having an atomic number selected from the group of numbers consisting of 28 to 29, said metal predominating in the alloy, the latter containing 1% to 5% of lithium, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.50 mc. (200 meters) and about 1.33 mc. (225 meters), and the other discharge being generated by a cyclic energy quantum equivalent to a sinusoidal frequency between about 10 cycles per second (30,000,000 meters) and about 10,000 cycles per second (6,000 meters).

7. The method of producing nitrogen oxide comprising introducing a gaseous medium consisting principally of nitrogen gas and oxygen gas into a gas discharge apparatus having an assemblage of at least three separately spaced electrodes, two of said electrodes being high potential electrodes, said assemblage of electrodes being positioned to have a cyclic electrical discharge pass between a pair thereof, one of said pair being a low potential electrode, said electrodes comprising a lithium alloy of a metal having an atomic number selected from the group of numbers consisting of 28 to 29, said metal predominating in the alloy, the latter containing 1% to 5% of lithium, and subjecting said gaseous medium to the action of a composite cyclic luminous electrical discharge produced by the intersection of a plurality of separate cyclic electrical discharges differing in energy quantum, each of said discharges emanating from a separate high potential electrode, one of said discharges being generated by a cyclic energy quantum equivalent to a sinusoidal frequency between about 1.53 mc. (195 meters) and about 1.28 mc. (235 meters), and the other discharge being generated by a cyclic energy quantum equivalent to a sinusoidal frequency between about 10 cycles per second (30,000,000 meters) and about 50,000 cycles per second (6,000 meters).

WILLIAM J. COTTON.

REFERENCES CITED

The following references are of record in the file of this patent:

UNITED STATES PATENTS

| Number | Name | Date |
|---|---|---|
| 672,231 | Lacomme | Apr. 16, 1901 |
| 1,601,500 | Island | Sept. 28, 1926 |
| 2,089,966 | Kassner | Aug. 17, 1937 |
| 2,106,780 | Whittier | Feb. 1, 1938 |
| 2,257,177 | Luster | Sept. 30, 1941 |
| 2,313,028 | Seigmann | Mar. 2, 1943 |

FOREIGN PATENTS

| Number | Country | Date |
|---|---|---|
| 14,259 | Great Britain | 1906 |
| 206,241 | Great Britain | 1923 |
| 303,822 | Great Britain | 1928 |
| 315,367 | Great Britain | 1930 |
| 353,076 | Great Britain | 1931 |
| 400,431 | Great Britain | 1933 |
| 691,099 | France | 1930 |
| 184,871 | Switzerland | 1936 |

OTHER REFERENCES

Hackh's Chemical Dictionary, 2d edition, page 787.